United States Patent [19]

Dukas et al.

[11] Patent Number: 5,687,949
[45] Date of Patent: Nov. 18, 1997

[54] GAS FLOW REGULATOR VALVE

[75] Inventors: Sander G. Dukas, Virginia Beach; Kevin S. Bailey, Hampton; Robert N. Cooper; Michael D. Heck, both of Virginia Beach, all of Va.

[73] Assignee: Controls Corporation of America, Virginia Beach, Va.

[21] Appl. No.: 638,228

[22] Filed: Apr. 26, 1996

[51] Int. Cl.[6] ........................ F16K 1/38
[52] U.S. Cl. ................. 251/122; 251/264; 251/903
[58] Field of Search ....................... 251/122, 205, 251/903, 264, 273; 137/903

[56] References Cited

U.S. PATENT DOCUMENTS

| | | |
|---|---|---|
| 2,348,548 | 5/1944 | Koehler . |
| 3,058,719 | 10/1962 | Beebee ........................ 251/273 |
| 3,071,344 | 1/1963 | Banks ........................ 137/903 X |
| 3,198,206 | 8/1965 | O'Brien . |
| 3,204,925 | 9/1965 | Montuori . |
| 3,228,655 | 1/1966 | Weise ........................ 251/122 X |
| 3,356,335 | 12/1967 | Koch et al. . |
| 3,409,271 | 11/1968 | Kallenbach . |
| 3,615,072 | 10/1971 | Kaucher . |
| 4,483,512 | 11/1984 | Drapeau . |
| 4,601,310 | 7/1986 | Phillips . |
| 4,687,181 | 8/1987 | Simonelli et al. . |
| 4,778,150 | 10/1988 | Pratt et al. . |
| 4,811,929 | 3/1989 | Scaramucci ........................ 251/122 |
| 4,907,780 | 3/1990 | Phillips . |
| 4,917,355 | 4/1990 | Dark et al. . |
| 5,106,055 | 4/1992 | Phillips . |
| 5,351,936 | 10/1994 | Tanikawa et al. . |
| 5,375,813 | 12/1994 | Rozinsky . |

Primary Examiner—Kevin Lee
Attorney, Agent, or Firm—Edward J. Kondracki; Kerkam, Stowell, Kondracki & Clarke, P.C.

[57] ABSTRACT

An improved fluid control valve assembly employing a needle valve integrally formed on a non-rotating valve stem includes a metering orifice for engaging and forming a fluid seal with the valve needle, and a generally radially extending end face on the valve stem for engaging an opposing wall surface acting to positively stop the valve stem upon fully closing the valve and forming a seal between the metering orifice and valve needle to thereby avoid excessive loads and wear between the metering orifice and valve needle.

13 Claims, 2 Drawing Sheets

GAS FLOW REGULATOR VALVE

BACKGROUND OF THE INVENTION

1. Field of the Invention

This invention relates to gas flow regulators and more particularly to a gas flow regulator employing an improved compact non-rotating fluid valve.

2. Description of the Prior Art

Flow regulators employing a manually adjustable valve for opening and closing a fluid flow passage and for regulating the flow of fluid through the passage are well known and widely used in a variety of applications. Where accurate control of a relatively low flow rate is required, it is common practice to employ a manually operated needle valve for this purpose because of the fine adjustment and accurate control provided by such valves.

The relatively high ratio of valve actuator movement to valve opening change which makes needle valves particularly suitable for accurate flow control can also result in relatively high concentrated loads, and consequently rapid wear and damage to the valve needle and valve seat, upon closing and opening of the valve. This is particularly true where excessive closing force may inadvertently be applied by the actuator as can sometimes happen even with highly trained personnel operating the device.

Gas flow regulators of the type employing a needle valve for controlling the flow rate are frequently employed, for example, in a health care application for control of oxygen or other breathing gases or gas mixtures, hereinafter "medical air", where reliable and accurate control of flow rate is critical. Such medical air regulators generally are subject to frequent adjustments and to opening and closing operations which can result in excessive needle and seat wear requiring frequent maintenance.

Requirements for the performance and operation of compressed gas regulator valves have been developed and are published in *Standard For Compressed Gas Regulator Accessories*, UL252A, First Edition, Jul. 12, 1991, as revised, by Underwriters Laboratories, Inc. These standards require a regulator valve having a handwheel diameter of one inch or less such as are commonly used in medical air applications to perform in the intended manner for 6000 cycles of operation from the open to closed position with the stem being closed by a torque of ten (10) inch-pounds, and to pass a prescribed seat leakage test after the 6000 cycles of operation. It is, of course, desirable for such valves to perform properly for much more than 6000 cycles of operation, but chafing and distortion or wear of the valve needle and valve seat as a result of the highly concentrated loading in the area of contact between the needle and seat has in the past frequently resulted in excessive leaking after substantially fewer then 6000 cycles of operation. Wear has been especially severe in the case of needle valve elements having a very small conical angle which can produce a high mechanical advantage and a correspondingly high concentrated load during closing.

It is known to provide flow regulating or flow metering valves with a non-rotating needle to reduce chafing and damage to the valve needle and valve seat. These devices generally have been relatively complex and expensive to manufacture, however, and the needles have not always been truly non-rotating in that they depend upon frictional contact between the needle and valve seat to overcome spring or other preloading of the valve stem.

In one prior art metering valve employing a non-rotating stem tip, the inner end of the valve stem is in the form of a tubular element housing an elongated coil spring bearing against the end of a separate piston-like stem tip slidably mounted in the tubular stem element. The end of the tubular stem element is roll-formed to capture the piston element and the stem tip, or needle, projects from the end of the piston to engage a metering orifice when the valve is closed. Closing the valve by a manually adjustable actuator knob to seat the needle in the metering valve will close the orifice with a predetermined force limited by the compressive load in the coil spring. When the friction between the needle and metering orifice of the valve seat overcomes the preload of the coil spring, the piston and needle will stop rotation relative to the valve seat. Conversely, upon opening the valve, after the preload is reduced a predetermined amount, the piston and needle will commence to rotate in contact with the valve seat until separation occurs. This valve structure is relatively complex and expensive to manufacture and maintain, and does not completely eliminate the undesirable rotation of the valve needle in contact with the valve seat and metering orifice.

A fluid control valve employing a non-rotating valve element is disclosed in U.S. Pat. No. 5,351,936. This device employs a manually turned actuator and valve stem supported in axial alignment with and bearing on the end of a non-rotating valve element so that turning of the actuator in a direction to close the valve applies a closing force directly between the stem and valve element. The valve element is resiliently urged into contact with the stem, with this resilient force providing the retracting movement of the valve element upon rotation of the actuator in the opening direction to retract the stem.

A non-rotating flow control valve as disclosed in U.S. Pat. No. 5,106,055 employs a valve element having a threaded valve stem for engaging mating threads on a valve actuator knob which, in turn, threadably engages mating threads on the valve body, with the threads on the valve body and valve stem being of opposite hand whereby movement of the actuator knob a predetermined distance produces greater movement of the valve element. Friction between the valve element and the valve body is relied upon to prevent rotation of the valve stem.

U.S. Pat. Nos. 4,778,150 and 3,615,072 disclose non-rotating valve members in which the valve stem has a non-circular guide segment telescopingly received in a complementary non-circular guide retained in or formed as a part of the valve body to positively prevent rotation of the valve stem. In each of these patents, the valve stem threadably engages a rotating actuator for opening and closing of the valve.

U.S. Pat. No. 3,356,335 discloses a cylinder valve in which a non-rotating valve stem has rigidly mounted thereon a non-metallic tip for engaging the valve seat in the valve body, with the valve seat moving with the stem upon rotation of the actuator knob. The non-metallic element is blunt-shaped to minimize valve stem travel required to open and close the valve.

U.S. Pat. No. 3,204,925 discloses a fluid control valve with a non-rotating stem in which the valve stem is attached to an actuator handle stem by a ball detent means, with a spherical ball providing an axial bearing surface between the valve stem and the actuator handle stem. The actuator handle stem is threadably received in a bonnet element which provides pressure onto a packing nut and packing assembly surrounding the non-rotating valve stem. The stem incorporates a needle or tapered valve element which directly engages a valve seat or orifice in the valve body.

While the prior art flow controllers employing non-rotating valve stems reduce the problem of chafing of the valve and valve seat, such non-rotating valve stems have not completely alleviated the problem of distortion and wear from concentrated loading. This is particularly true in cases where excessive closing torque may inadvertently be applied. Further, the known non-rotating valve flow controllers have generally been relatively large and complex in structure, and consequently expensive to manufacture and to maintain. It is, accordingly, a primary object of the present invention to provide an improved gas flow regulating valve having a non-rotating valve stem.

Another object is to provide such a gas flow regulating valve which is compact, of simple design and which requires a minimum of maintenance.

Another object is to provide such a gas flow regulating valve which is less prone to damage as a result of excessive closing torque.

Another object is to provide such a gas flow regulating valve which has a substantially greater operating life and which is easily and inexpensively maintained without requiring the services of highly skilled maintenance personnel.

SUMMARY OF THE INVENTION

The foregoing and other objects and advantages are achieved in a gas flow control valve including a valve body having an inlet and an outlet connected within the valve body by a gas flow passage having a valve seat therein. A valve guide is threadably received in a bore which extends through a bonnet on the valve and terminates in a generally conical end wall in the valve body. The valve guide has a cylindrical barrel for telescopingly receiving a valve stem having a radial shoulder adjacent its outer end for engaging an opposing radial shoulder on the valve guide to limit outward movement of the valve stem. An axial extension of the stem projects through an opening in the outer end of the guide for engaging and being attached to a handwheel or actuator.

The handwheel has a central opening which receives the outwardly extending end of the valve stem and a snap ring-type interlocking element retains the wheel in the stem for free rotation relative thereto. The handwheel is cup-shaped, with internal threads engaging external threads on the valve guide to move the valve stem axially within the guide barrel upon rotation of the handwheel. The valve stem is provided with one or more O-ring seals supported within annular grooves in the cylindrical valve stem to provide both a fluid seal and limited frictional resistance to rotation of the stem.

The inner end of the valve stem, i.e., the end opposite the handwheel, has a needle valve element projecting axially from a substantially radial end face. The needle projects into a metering orifice in a valve seat member, with the metering orifice in axial alignment with a gas flow passage from the valve chamber to the outlet. The valve seat has a substantially flat planar surface disposed in opposition to the radial face of the valve stem, and a generally frustoconical surface mating with and seated upon the a complementary end wall surface of the bore in the valve body. An axially extending skirt on the valve guide normally engages the outer peripheral edges of the valve seat to firmly and positively retain the valve seat in position within the valve with the axis of the metering orifice being on the longitudinal central axis of the valve needle and valve stem. Openings in the skirt of the valve guide permit fluid communication from the valve inlet into the chamber between the valve stem face and valve seat.

The valve seat is preferably formed from a non-metallic material such a polytetrafluoroethylene, or Teflon, to reduce friction and wear of the valve seat and needle upon opening and closing of the valve. Also, the conical angle of the needle, i.e., the angle of inclination of the needle surface relative to its axis, is preferably very small to provide highly accurate metering through the orifice. Upon closing of the valve to stop flow therethrough, the valve needle contacts the metering orifice around its entire periphery at a location adjacent the maximum diameter of the needle and closely adjacent the radial face of the valve stem. Further axial movement in the direction to close the valve brings the radial face into contact with the opposed surface of the valve seat so that, in the event of excess closing pressure applied through the handwheel, such excess load is transmitted through the entire face of the valve seat and not concentrated at the substantially line contact sealing area between the valve needle and metering orifice, whereby distortion and valve wear is substantially reduced. Also, in the event of wear of the valve seat, the valve guide may be threaded from the valve body, and the valve seat removed and replaced very easily and quickly.

DESCRIPTION OF THE DRAWINGS

The foregoing and other features and advantages of the invention will be apparent from the detailed description contained hereinbelow, taken in conjunction with the drawings, in which.

DESCRIPTION OF THE PREFERRED EMBODIMENT

Figure 1:
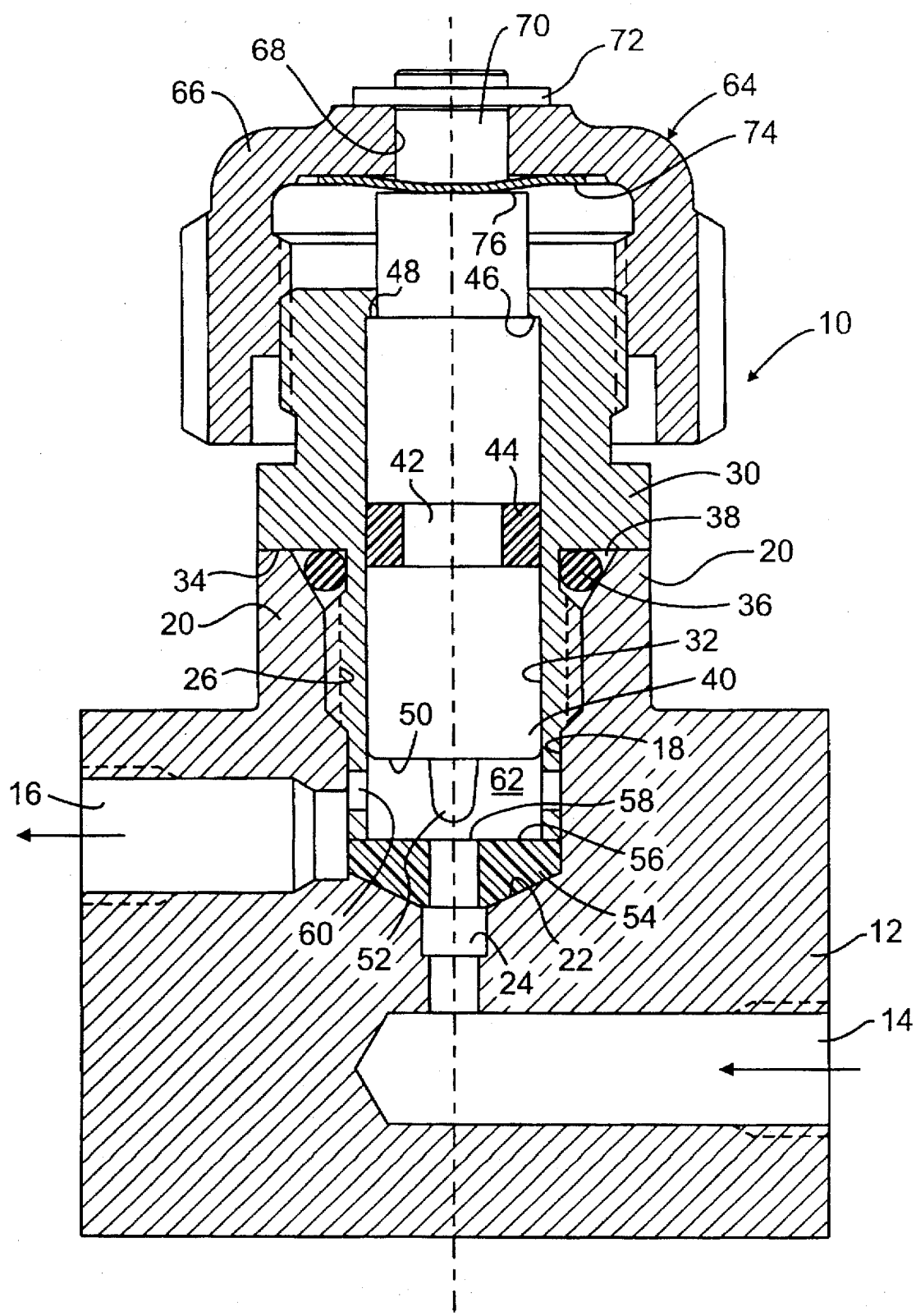
FIG. 1 is a sectional view of an improved flow control needle valve embodying the invention in the fully open position.

Referring now to the drawings in detail, a valve assembly according to the present invention is indicated generally by the reference numeral 10 and includes a valve body 12 having an inlet port 14 and an outlet port 16. A cylindrical bore 18 extends through the bonnet portion 20 of the valve body and terminates in a generally conical end wall 22 within the valve body. A fluid passage 24 extends coaxially with the bore 20 from the conical end wall 22 to communicate with the outlet bore 16. An internally threaded counterbore 26 is formed in the bonnet 20 for mounting a valve guide member 30.

The elongated guide valve member 30 has an axial bore or barrel portion 32 formed therein and external threads thereon for engaging the internal threads of counterbore 26. A radial shoulder 34 on the outer surface of the valve guide provides a positive stop limiting movement into the bonnet. The shoulder 34 prevents damage to the seat 54 from excessive torque on the valve guide 30. A resilient O-ring 36 mounted in a chamber 38 provides a fluid-tight seal between the bonnet 20 and the external surface of the valve guide.

Figure 2:
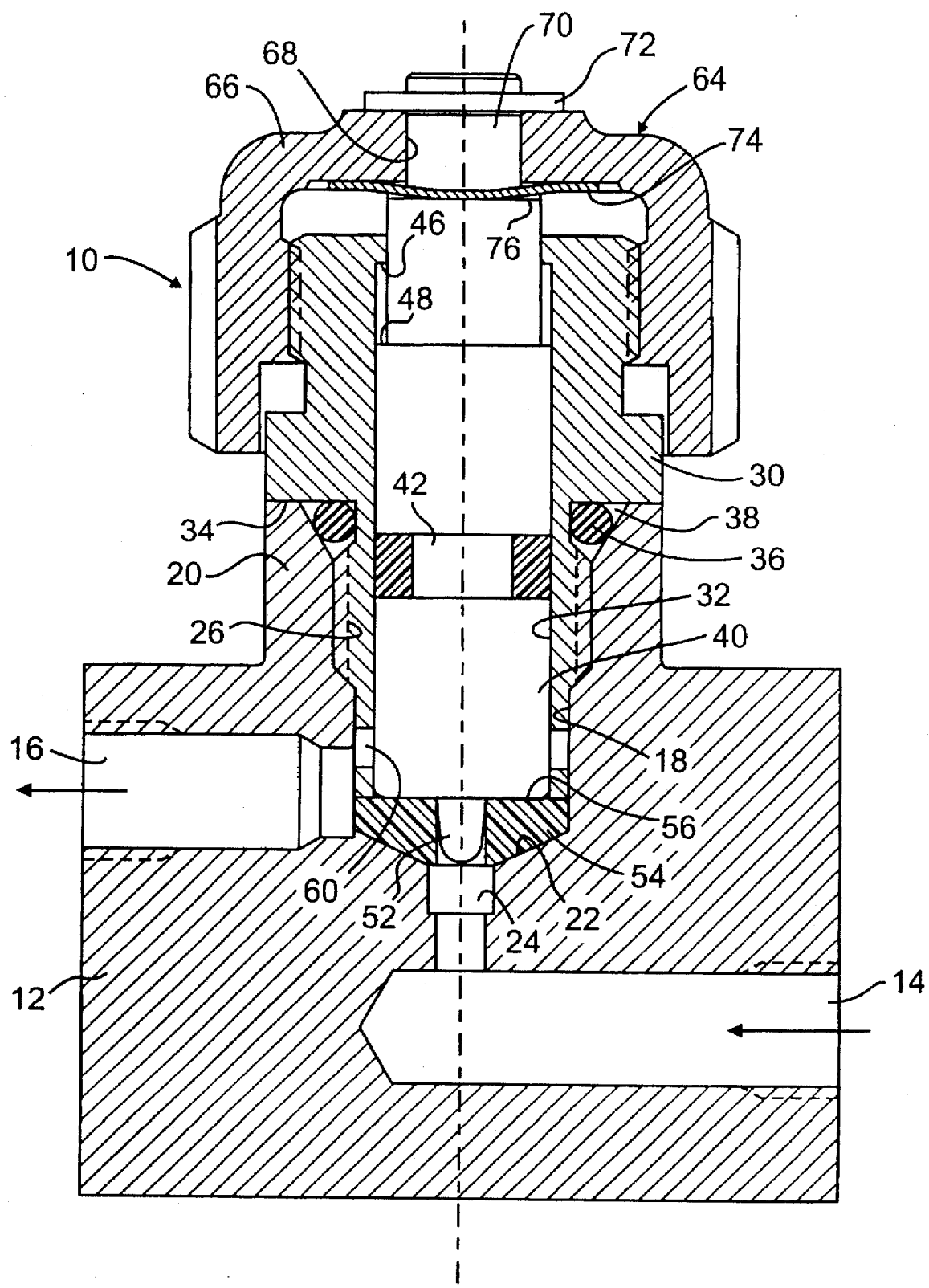
FIG. 2 is a view similar to FIG. 1 showing the valve in the fully closed position.

A valve stem 40 having a generally cylindrical portion acting as a piston is slidably mounted within the cylindrical barrel 32 of the valve guide for movement between a fully open position shown in FIG. 1 and a fully closed position shown in FIG. 2. One or more O-ring grooves 42 are formed in the cylindrical piston portion of the valve stem for receiving an O-ring seal 44 to provide a fluid-tight seal between the valve stem and the valve guide. A radially inwardly extending flange 46 at the outwardly projecting end of valve guide 30 is adapted to engage a shoulder 48 on the stem 40 to limit outward movement of the valve stem.

Valve stem 40 terminates on its inner end in a generally radial face 50, with an integrally formed needle valve element 52 extending from the face 50 in coaxial relation with the valve stem 40 and with the fluid passage 24. Valve needle 52 has a relatively small conical angle along a substantial portion of its length to provide accurate metering of flow of fluid through the valve in the manner described more fully hereinbelow.

A removable disc-like valve seat 54 preferably formed of a low friction synthetic resin material such as polytetrafluoroethylene, is positioned within the bore 18 with one surface of the valve seat complementary to and engaging end wall 22 and its opposite surface 56 being substantially complementary to and disposed in opposed relation to end face 50. Valve seat 54 has a metering orifice 58 extending therethrough in axial alignment with the needle 52 and valve stem 40, with the diameter of the metering orifice being substantially equal to but slightly less than the maximum diameter of the needle 52 adjacent the end face 50 whereby, when the valve is moved to the closed position, the outer surface of needle 52 will contact and form a seal with the open end of the metering orifice immediately prior to end face 50 contacting valve seat surface 56.

The valve seat 54 may be retained in position under the valve guide 30 by engagement with the inner end of the valve guide, with the valve guide being provided with apertures, indicated schematically at 60, through a skirt portion adjacent its end to provide gas flow passage from the inlet 14 through the valve chamber 62 to the outlet 16 at a location between end face 50 and surface 56. The seat 54 is retained in position by applying a controlled torque to the valve guide 30. For clarity of illustration, the openings 60 are illustrated in the drawings as spaced from the inner end of valve guide 30, it being understood that these openings will be spaced closely adjacent the end of the valve guide to permit a flow of fluid from chamber 62 to outlet 16 until the valve needle 52 engages and closes orifice 58. Openings 60 may also be in the form of notches, or cutouts, in the inwardly directed end face of the valve guide skirt.

Valve guide 30 is provided with male threads on its outwardly projecting end portion which engage female threads on the inner periphery of a cup-shaped handwheel 64. The end wall 66 of handwheel 64 is provided with an axial opening 68 which telescopingly receives a reduced diameter portion 70 on the outwardly projecting end of valve stem 40, and a suitable fastener such as a snap ring 72 received in a retaining groove (not shown) on the cylindrical end portion 70 retains the handwheel against removal. Preferably, a low strength belleville washer or other spring-like element 74 is disposed between the end wall 66 and a shoulder 76 on the valve stem to resiliently urge the handwheel into continuous engagement with the snap ring 72.

Handwheel 66 is freely rotatable on the valve stem, with the valve stem being restrained for axial movement with the handwheel upon rotation thereof either by the spring 74 and shoulder 76 or by the snap ring 72. Outward movement of the valve stem by rotation of the handwheel to open the valve is limited by engagement of the shoulder 48 with the flange 46 while inward movement of the valve stem is limited by engagement of the end face 50 with the opposing complementary surface 56 of the valve seat.

In closing the valve, the interference fit between the peripheral edge of the metering orifice and the needle adjacent the face 50 will offer sufficient resistance to movement to be detected by an operator closing the valve as the seal is formed. Further movement of the handwheel will then quickly bring surfaces 50 and 56 into contact, and resistance to turning of the handwheel will immediately increase so that excessive pressure between the valve needle and metering orifice is avoided while providing positive closing of the valve. Further, the free rotation mounting of the valve stem and handwheel substantially completely eliminates rotational movement of the valve stem to eliminate chafing between the needle and valve seat orifice during the opening and closing operations. Any slight tendency of the valve stem to rotate with the handwheel is resisted by contact of the O-ring 44 with the cylindrical bore 32.

While the end face 50 of the valve stem has been described as being generally radial, it is believed apparent that it need not be a truly radial face, but rather that it could be a generally conical surface having a relatively large cone angle which engages a complementary surface on the valve seat. Also, it is believed apparent that the valve seat may be of metal or other material rather than the polytetrafluoroethylene material described, and indeed that the valve seat and metering orifice may be formed as an integral part of the valve body, although the removable and replaceable valve seat element is preferred from the standpoint of ease and cost of maintenance. Thus, while a preferred embodiment of the invention has been disclosed and described, it should be understood that the invention is not so limited and that it is intended to include all embodiments which would be apparent to one skilled in the art and which come within the spirit and scope of the invention.

What is claimed is:

1. A fluid control valve assembly comprising a valve body having a bore formed therein terminating in an end wall and a counterbore coaxial with said bore and having internal threads formed therein, a valve guide having a cylindrical valve chamber formed therein, said valve guide having first and second external thread means thereon with said first external threads engaging the internal threads in said counterbore for mounting said valve guide on said valve body, an inlet port in said valve body communicating with said bore, an outlet port in said valve body, a fluid passage coaxial with said valve chamber and said bore extending from said end wall and communicating with said outlet port, a non-rotating valve stem mounted in said valve guide chamber for axial movement therein, said valve stem having an outer end extending outwardly from said valve guide and an inner end having a substantially radial face and a valve needle integrally formed on and projecting axially from said substantially radial face coaxially with said valve chamber and said valve stem, a valve seat mounted within said valve chamber, said valve seat having a first surface complementary to and engaging said end wall and a second generally radial surface disposed in opposition to said substantially radial face, a metering orifice formed in and extending through said valve seat in coaxial relation with said valve stem and said valve needle, said metering orifice communicating with said fluid passage and being dimensioned to receive and cooperate with said needle valve to provide flow control through the valve from said inlet port to said outlet port when said valve stem is moved from the closed position and to engage and provide a seal with the valve needle when the valve stem is in the closed position, and actuator wheel means axially fixed on the outer end of said valve stem for substantially free rotation thereon, said actuator wheel means including internal thread means engaging and cooperating with said second external thread means on said valve guide whereby rotation of the actuator wheel means will produce axial movement of the valve stem to move the valve stem between the open and closed positions.

2. The valve assembly defined in claim 1 wherein said substantially radial face on said valve stem engages said substantially radial surface on said valve seat and cooperates therewith to provide a positive stop for said valve stem when the valve is in the closed position.

3. The valve assembly defined in claim 1 wherein said valve seat has a diameter substantially equal to the diameter of the bore in said valve body, and wherein said valve guide has an open inner end portion engaging said valve seat around its peripheral edge portion to retain said first surface in engagement with said end wall.

4. The valve assembly defined in claim 3 further comprising means defining a fluid passage extending through the inner end portion of said valve guide providing fluid communication between said inlet and said valve chamber.

5. The valve assembly defined in claim 4 wherein said substantially radial face on said valve stem engages said substantially radial surface on said valve seat and cooperates therewith to provide a positive stop for said valve stem when the valve is in the closed position.

6. The valve assembly defined in claim 5 wherein said valve seat is integrally molded from a low friction synthetic resin material.

7. The valve assembly defined in claim 6 further comprising O-ring means providing a fluid seal between said valve stem and said valve guide.

8. The valve assembly defined in claim 7 further comprising snap ring means releasably mounting said actuator wheel means on said valve stem.

9. The valve assembly defined in claim 2 wherein said valve needle and said metering orifice are dimensioned to provide a substantially line-contact seal immediately prior to said substantially radial face contacting said substantially radial surface upon closing the valve, and wherein said substantially radial face and said substantially radial surface cooperate to increase sealing of the valve upon application of increase closing force by rotation of said actuator wheel whereby valve seat distortion and valve needle wear are reduced.

10. The valve assembly defined in claim 1, wherein said valve needle and said substantially radial face on said valve stem comprise sealing means for minimizing damage and wear by first initializing the seal by line contact on the valve stem and then as closing force is increased, providing increased sealing by establishing the sealing on the said radial face.

11. The valve assembly as defined in claim 1, further including means for the transfer of load from said stem to said radial face for minimizing distortion and valve wear.

12. The valve assembly as defined in claim 10, further including means for the transfer of load from said stem to said radial face for minimizing distortion and valve wear.

13. A fluid control valve assembly comprising
a valve body having a bore formed therein terminating in the valve body, and a counterbore coaxial with said bore and having internal threads formed therein,
a valve guide having a cylindrical valve chamber formed therein, said valve guide having first and second external thread means formed thereon with said first external thread means engaging the internal threads in said counterbore for mounting said valve guide on said valve body and having an open inner end disposed within said bore,
an inlet port in said valve body communicating with said bore,
an outlet port in said valve body,
a non-rotating valve stem mounted in said valve guide chamber for axial movement therein, said valve stem having an outer end extending outwardly from said valve guide and an inner end having a substantially radial face and a valve needle integrally formed on and projecting axially from said substantially radial face coaxially with said valve chamber and said valve stem,
a valve seat having a generally radial surface disposed in opposition to said radial face,
a metering orifice formed in and extending through said valve seat in coaxial relation with said valve stem and said valve needle, said metering orifice providing fluid communication between said valve chamber and said outlet and being dimensioned to receive and cooperate with said needle valve to provide flow control through the valve from said inlet port to said outlet port when said valve stem is moved from the closed position and to engage and provide a seal with the valve needle when the valve stem is in the closed position, and
actuator wheel means axially fixed on the outer end of said valve stem for substantially free rotation thereon, said actuator wheel means including internal thread means engaging and cooperating with said second external thread means on said valve guide whereby rotation of the actuator wheel means will produce axial movement of the valve stem to move the valve stem between the open and closed positions,
said generally radial surface of said valve seat engaging and cooperating with said substantially radial face to provide a positive stop for said valve stem when the valve is in the closed position.

* * * * *